(12) United States Patent
Huber

(10) Patent No.: US 10,419,104 B2
(45) Date of Patent: Sep. 17, 2019

(54) END SYSTEM DEVICE WITH INTEGRATED SWITCHING DEVICE

(71) Applicant: Airbus Defence and Space GmbH, Taufkirchen (DE)

(72) Inventor: Ferdinand Huber, Ingolstadt (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 119 days.

(21) Appl. No.: 15/611,094

(22) Filed: Jun. 1, 2017

(65) Prior Publication Data

US 2017/0353230 A1 Dec. 7, 2017

(30) Foreign Application Priority Data

Jun. 1, 2016 (DE) .......... 10 2016 110 148

(51) Int. Cl.
*H04B 7/185* (2006.01)
*H04L 12/931* (2013.01)
(Continued)

(52) U.S. Cl.
CPC ....... *H04B 7/18506* (2013.01); *H04L 49/351* (2013.01); *H04L 67/12* (2013.01); *H04L 67/2814* (2013.01); *H04L 5/14* (2013.01)

(58) Field of Classification Search
CPC ............. H04L 67/12; H04L 2012/4028; H04L 49/351; H04L 41/145; H04L 5/14; H04L 67/34; H04L 69/40; H04L 12/4625; H04L 45/00; H04L 12/437; H04L 12/4637; H04L 41/0803; H04L 41/0806; H04L 67/125; G05D 1/0077; H04B 7/18506;
(Continued)

(56) References Cited

U.S. PATENT DOCUMENTS

2006/0110162 A1 5/2006 Tian et al.
2011/0116508 A1 5/2011 Kirrmann
(Continued)

FOREIGN PATENT DOCUMENTS

EP 2566111 A1 3/2013

OTHER PUBLICATIONS

The German Patent and Trade Mark Office, Office Action for German Patent Application No. 10 2016 110 148.6 dated Jan. 30, 2017.

(Continued)

*Primary Examiner* — Kevin C. Harper
*Assistant Examiner* — Mon Cheri S Davenport
(74) *Attorney, Agent, or Firm* — Lorenz & Kopf LLP

(57) ABSTRACT

Provided is an end system device for a network system with a first port for connection with the network system, a second port for connection with the network system, a local interface and a switching device. The switching device is designed to switch into a first or a second mode. In the first mode, the switching device is set up to relay data received at the first and second port to the local interface, and relay data received at the local interface to the first port and the second port. In the second mode, the switching device is set up to relay data received at the first port to the second port or to the local interface, relay data received at the second port to the first port or to the local interface, and relay data received at the local interface to the first port and the second port.

9 Claims, 5 Drawing Sheets

(51) Int. Cl.
*H04L 29/08* (2006.01)
*H04L 5/14* (2006.01)

(58) Field of Classification Search
CPC ...... H04B 10/2504; H04B 1/40; B60R 16/03; B64C 13/42; G06F 11/1658; G06F 11/2038; G06F 13/1663; H02H 3/006; H02H 3/05; H04J 3/0641; G05B 9/03; B64D 45/00; G09G 2380/12
See application file for complete search history.

(56) References Cited

U.S. PATENT DOCUMENTS

| | | | | |
|---|---|---|---|---|
| 2012/0027022 | A1* | 2/2012 | Birkedahl | H04L 12/4641 370/401 |
| 2013/0208630 | A1* | 8/2013 | Bobrek | H04L 67/12 370/276 |
| 2016/0154391 | A1* | 6/2016 | Pavaskar | G05B 15/02 701/3 |

OTHER PUBLICATIONS

European Patent Office, Extended European Search Report for Application No. 17173876.8-1857 dated Oct. 12, 2017.

Ahmed Amari, et al., "AeroRing: Avionics Full Duplex Ethernet Ring with High Availability and QoS Management," (2016) In: Proceedings of European Congress on Embedded Real Time Software and Systems 2016, Jan. 27, 2016-Jan. 29, 2016 (Toulouse, France).

Ahmed Amari, et al., "Worst-Case Timing Analysis of AeroRing—A Full Duplex Ethernet Ring for Safety-critical Avionics," (2016) In: 12th IEEE World Conference on Factory Communication Systems (WFCS), May 3, 2016-May 6, 2016 (Aveiro, Portugal).

Arinc Specification 664 P7-1, Aircraft Data Network, Part 7, Avionics Full-Duplex Switched Ethernet Network, published Sep. 23, 2009 by Aeronautical Radio, Inc., Annapolis, Maryland.

* cited by examiner

END SYSTEM DEVICE WITH INTEGRATED SWITCHING DEVICE

CROSS-REFERENCE TO RELATED APPLICATION

This application claims the benefit of, and priority to, German patent application number DE 102016110148.6, filed Jun. 1, 2016.

TECHNICAL FIELD

Embodiments of the subject matter described herein relate to networks for communication between end systems, and in particular to an end system device with an integrated switching device for such a network.

BACKGROUND

For example, Avionics Full Duplex Switching Ethernet (AFDX) is used for communication between aircraft systems, which is a conventional designation for ARINC Standard 664. This standard describes a network and the accompanying protocol for communication between aircraft systems.

In such AFDX networks, AFDX end systems are connected in a star topology by means of switches in point-to-multipoint connections (P2MP). To ensure redundancy, the network is duplicated. The network system thus encompasses a first network and a second network, which are built independently of each other. The data of the network end system are here output via two ports of the network end system to the independent networks.

In addition, the protocols High Availability Seamless Redundancy (HRS) and Parallel Redundancy Protocol (PRP) are used to ensure redundancy, in particular in networks of industrial and power plant automation. The latter are described in the IEC 62439-3 standard.

BRIEF SUMMARY

It is desirable to provide an improved end system device for a network system for communication between end systems.

Accordingly, an end system device, a network system, a vehicle as well as a corresponding method can be provided according certain embodiments of the present invention.

The disclosed subject matter is indicated by the features recited in the independent claims. Exemplary embodiments and other aspects of the disclosed subject matter are indicated by the features recited in the independent claims and described in the following specification.

In one aspect, an end system device for a network system comprises a first port for connection with the network system, a second port for connection with the network system, a local interface and a switching device. The switching device is here designed for switching into a first or a second mode. In the first mode, the switching device is set up to relay data received at the first and second port to the local interface, and relay data received at the interface to the first port and the second port.

In the second mode, the switching device is set up to relay data received at the first port to the second port or to the local interface, relay data received at the second port to the first port or to the interface, and relay data received at the interface to the first port and the second port.

In one aspect, a network system for communication between the end systems encompasses at least one, in particular at least two, end system device(s) according to embodiments of the present invention.

In one aspect, a vehicle, in particular an airplane, encompasses at least one, in particular two, end system device(s) according to an embodiment of the present invention.

In one aspect, a method for an end system device for a network system encompasses the steps of switching a switching device of the end system device into a first or a second mode, in the first mode, relaying data received at a first and second port of the end system device to a local interface of the end system device and relaying data received at the interface to the first port and second port, as well as, in the second mode, relaying data received at the first port to the second port or to the interface, relaying data received at the second port to the first port or to the interface and relaying data received at the interface to the first port and the second port.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Additional exemplary embodiments of the present invention will be described below, drawing reference to the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The illustrations on the figures are schematic and not to scale. In the following description of FIGS. 1 to 5, the same reference number is used for identical or corresponding elements.

Figure 1:
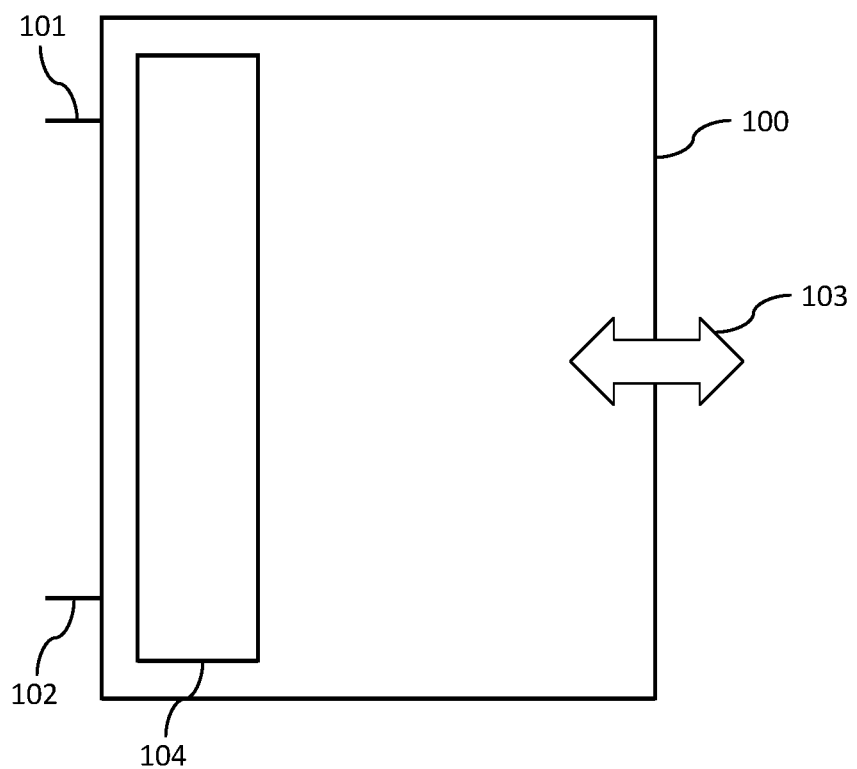
FIG. 1 shows a schematic view of an embodiment of the end system device.

FIG. 1 shows a schematic view of an end system device 100. The end system device 100 here encompasses a first port 101 and a second port 102. These ports are used for connection with the network system, and thus constitute network ports. The end system device 100 further encompasses a local interface 103. This local interface 103 is used for connection with local components of the end system, and thus for local communication. For example, this local interface 103 can be designed as a CPU interface or host CPU interface. In contrast to the ports 101 and 102, then, the local interface 103 is used for local combination with local components, and not for combination with a network system. In addition, the end system device 100 encompasses a switching device 104. This switching device 104 is used to distribute or relay data received at the first port 101, the second port 102 and the local interface 103, for example data packets. The precise function will be described below.

The switching device 104 can here be switched into a first and a second mode, or is designed to switch into a first or a second mode.

In the first mode, the data received at the first 101 and second 102 port are relayed to the local interface 103. Data received at the local interface 103 are in turn relayed to the first port 101 and the second port 102.

Figure 2:
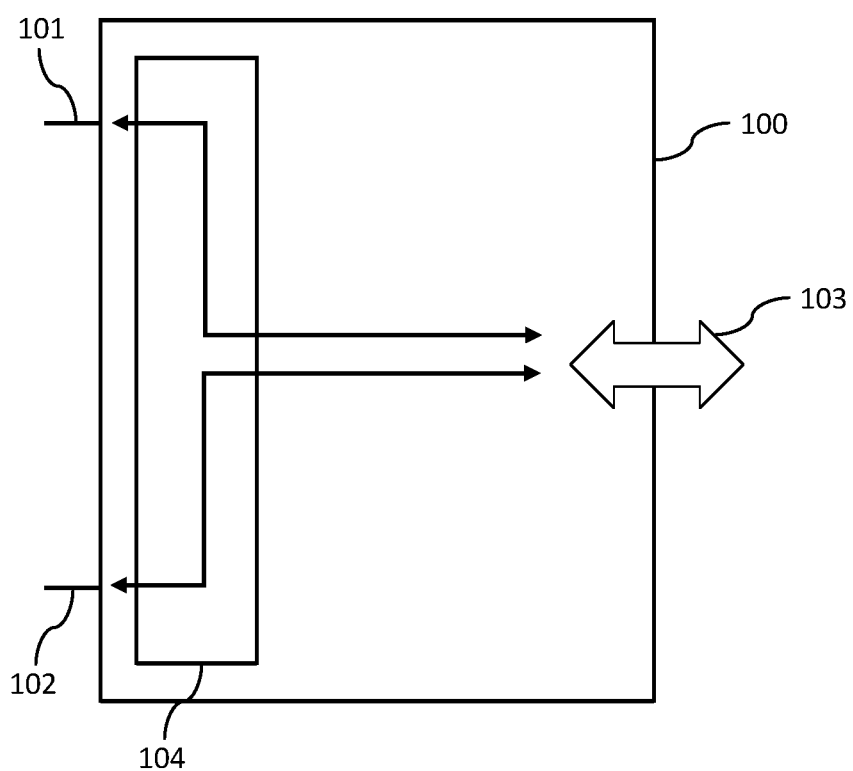
FIG. 2 shows an operation of the end system device in a first mode.

Such an operation is shown on FIG. 2. As evident from FIG. 2, relaying only takes place between the first port 101 and the local interface 103, as well as between the second port 102 and the local interface 103. However, packets or data are not relayed between the first port 101 and second port 102.

All data received at the local interface 103 are preferably here output to both the first port 101 and the second port 102. As a consequence, the data or data packets are preferably duplicated, and an output takes place at both ports 101 and 102.

Therefore, the data received at the local interface 103 are preferably output both to the first port 101 and to the second port 102. Ports 101 and 102 are here used for connection with two independent networks of a network system (not shown on FIG. 2), and are designed accordingly. The data of the local interface 103 are hence output identically on both networks of the network system.

Data received at the first port 101 and at the second port 102 are output to the local interface 103 or relayed to the latter. The switching device 104 is here preferably designed in such a way as to relay the data or data packets received at the first port 101 or the second port 102 to the local interface 103 if no copy of the data or data packet was received at the end system device 100 chronologically prior to receiving the data or data packet. The determination of a copy can here take place using a sequential number or user data of the received data or received data packet, for example. For example, the switching device 104 can accordingly be set up to check whether data or a data packet with an identical sequential number or identical user data have already been received, and correspondingly implement the transfer or discard the received data or the received data packet if a copy of the data or data packet was received at the end system device 100 chronologically prior to receiving the data packet. Therefore, it is evident to the expert that not all data or data packets received at the first port 101 and the second port 102 must be relayed to the local interface.

Such a first mode described above can be used when the end system device 100 is utilized in a network with a star topology.

Figure 3:
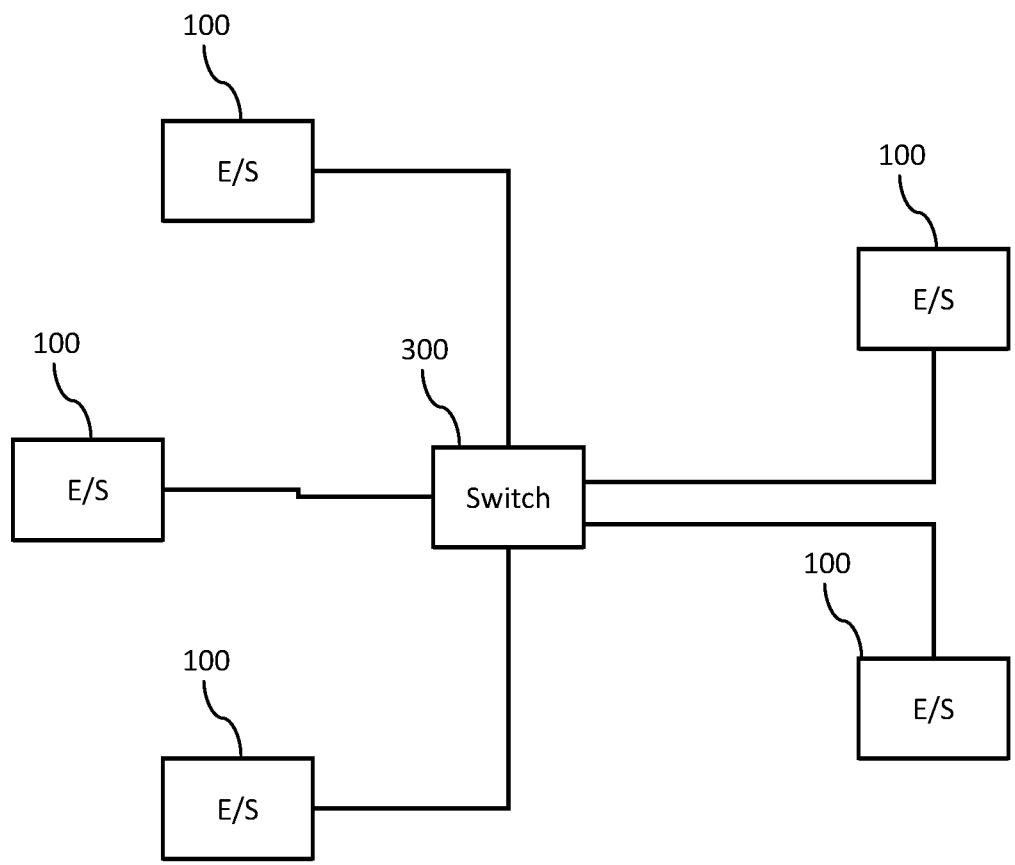
FIG. 3 shows a network system during an operation of the end system device in the first mode.

Such a topology is exemplarily shown on FIG. 3. One of the first 101 and second 102 ports of the end system 100 is here connected with a switch 103. The other port of the end system 101 or 102 is connected with a second network of the network system, which is not depicted on FIG. 3 for purposes of simplification, and also uses star topology in its structural design. The data output by the port connected with the switch 300 are output to the switch 300, which relays the data to another end system 100.

Figure 4:
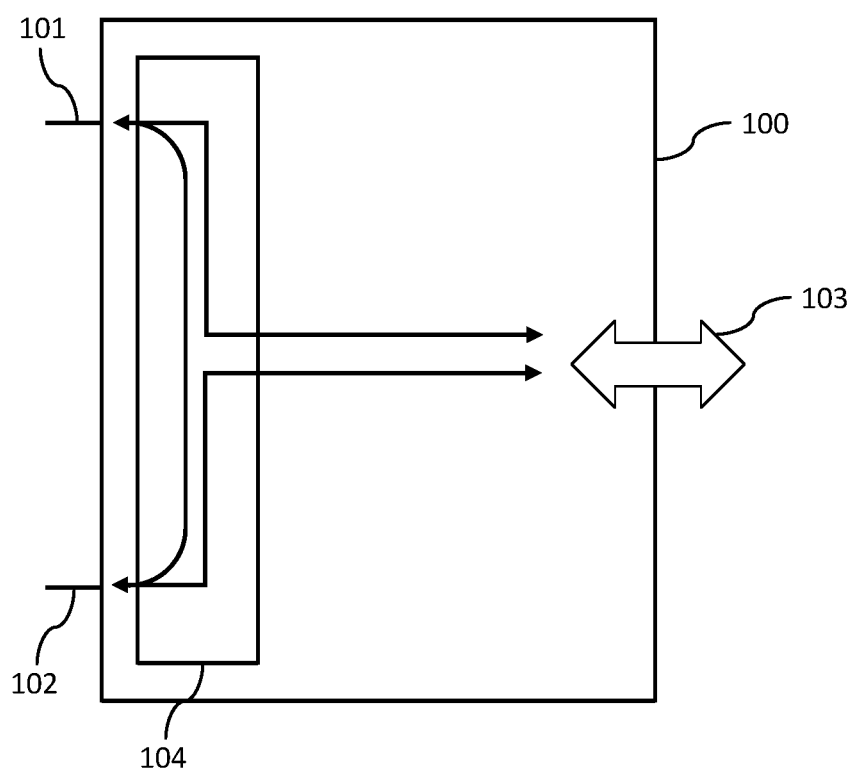
FIG. 4 shows an operation of the end system device in a second mode.

FIG. 4 will now be discussed in order to describe the second mode. In the second mode, the switching device 104 is designed to relay data or data packets received at the first port 101 to the second port 102 or to the local interface 103 or output them to the latter.

In addition, data or data packets received at the second port 102 are relayed to the first port 101 or to the local interface 103 or output to the latter, and data or data packets received at the local interface 103 are relayed to the first port 101 and the second port 102.

In contrast to operation in the first mode, it must correspondingly be noted that data or data packets are also relayed between the first and second ports 101 and 102 in the second mode. All data are preferably always relayed between the two ports.

The switching device 104 is here preferably designed in such a way that data received at the first port 101 are relayed to the local interface 103 if the data or data packet are intended for the end system device 100. Otherwise, the switching device 104 is preferably designed to relay the data received at the first port 101 to the second port 102 if the data or data packet are not intended for the end system device 100 (but rather for another end system device, for example).

Accordingly, data received at the second port 102 are preferably relayed to the local interface 103 if the data packet or data is/are intended for the end system device 100. Otherwise, data or data packets received at the second port 102 are relayed to the first port 101 if the data or data packet are not intended for the end system device 100. Such a determination can be made based on a packet header, for example.

Furthermore, the switching device 104 can preferably also check whether a copy of the data or data packet was received at the end system device 100 chronologically prior to receiving the data or data packet, and can accordingly relay data or data packets received at the first port 101 to the local interface 103 if the data or data packet are intended for the end system device and no copy of the data or data packet was received at the end system device 100 chronologically prior to receiving the data or data packet. The same holds true correspondingly for the data or data packets received at the second port. The determination of whether a copy was already received can be made according to the above explanations concerning the first mode.

The data received at the local interface 103 are preferably output to both ports 101 and 102 according to the operation in the first mode. This can take place according to the above explanations concerning the first mode.

Figure 5:
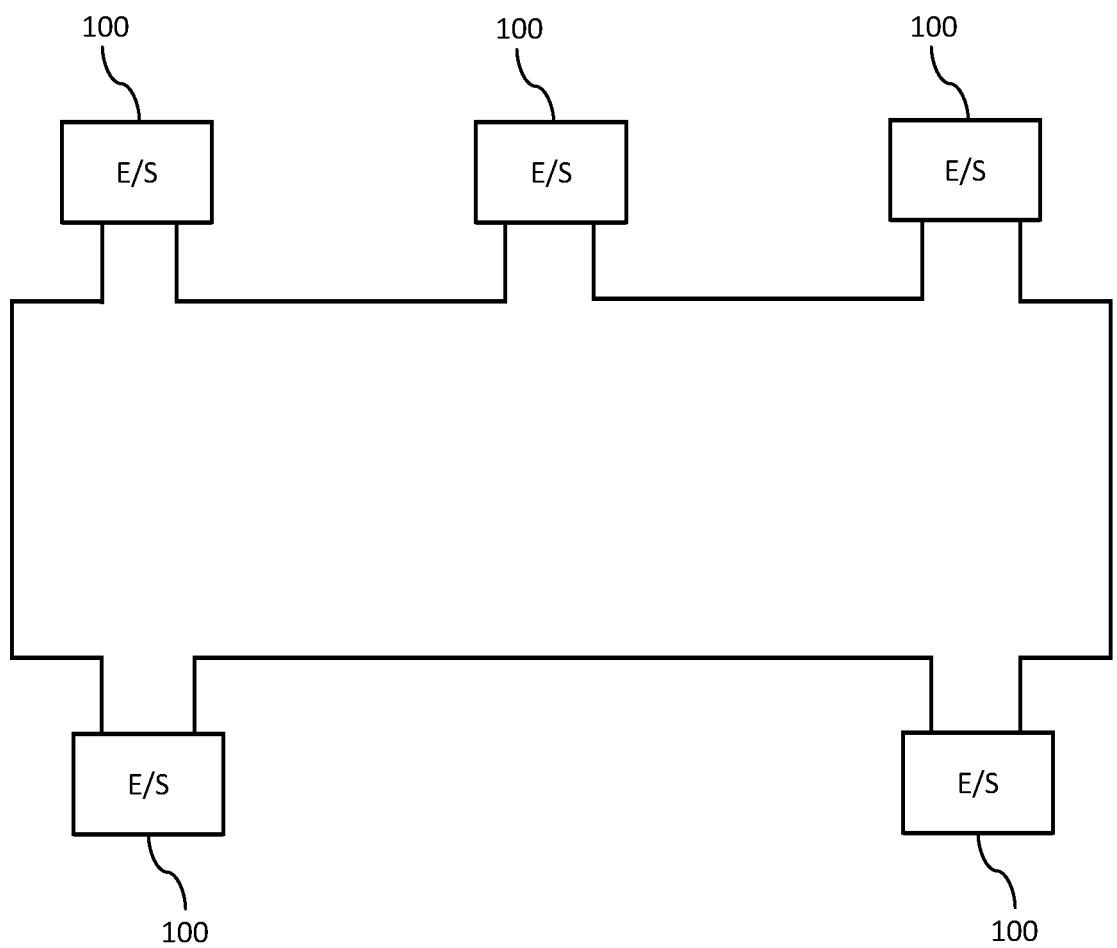
FIG. 5 shows a network system during an operation of the end system device in the second mode.

FIG. 5 here depicts the use of an end system device 100 during operation in the second mode in a network system.

As evident from FIG. 5, the end systems 100 are arranged in a network with an annular topology, wherein the first and second ports of the end system device 100 are each connected with a port of another end system device 100.

The operation of such an annular network system will now be exemplarily described based on FIG. 5. If an end system device 100 receives data from the accompanying local interface, it outputs the latter to both ports. The data thus move in both directions in the annular network, i.e., clockwise and counterclockwise on FIG. 5. The data packets are received by the respectively next end system device 100. The switching device of the respective end system device now determines whether the data are intended for it. If this is not the case, it outputs the data at its respective other port, and the data are disseminated further in the same direction in the annular network. If the data are intended for the end system device 100, i.e., if the end system device is the destination end system device of the data or data packet, it relays the latter to its local interface. Since the data are disseminated over the network in two directions, the destination end system device at a later point in time again reaches the same data or the same data packet at the other port of the destination end system device. The latter is then preferably discarded by the switching device, as explained above. An end system device is here further preferably designed to check whether it has already relayed the data packet or a copy thereof. If this is the case, the switching device of the end system device is preferably designed to discard the data packet. Therefore, it is obvious to the expert that not all data or data packets received at the ports must be relayed to the respective other port.

Therefore, the embodiment of the end system device 100 with a switching device 104 described above makes it possible to operate the end system device 100 in both a first mode and in a second mode. The end system device 100 can thus be operated in annular or star topologies or networks with a single implementation of the end system. As a result, the same end system can be used in ring and star topologies, and the end system need only be developed and certified once, for example. For example, this reduces the system costs while also allowing a simpler reconfiguration.

For example, the switching device 100 described above can here integrating a switch or integrating a miniature switch into an end system or an end system device. The switch or miniature switch can here be deactivated to establish the first mode, and activated to establish the second mode, so as to achieve the relaying properties of the switching device 104. As a consequence, the switch is not active during operation in a first mode, and packets are not relayed between the first port 101 and the second port 102. In the second mode, the switch is active, and relaying between the ports 101 and 102 does take place.

Options and additional comments relating to configuration or setting or adjusting the switching device to the first mode or the second mode will be described below.

The switching device can be designed to be switched or switch into the first mode or second mode, for example as a function of a resistance, a configuration parameter or dataset or an input signal.

Given a configuration based on an external resistance, the switching device can check a resistance between two pins or two inputs (not shown on the figures), for example. If the resistance is high or low (high or low), a corresponding configuration can be implemented. For example, a configuration can thus take place by connecting the two inputs, e.g., by means of soldering or an adjustable jumper.

In addition, a configuration dataset can also be used for configuration purposes. For example, the latter can be stored in an external memory, e.g., an EEPROM. This configuration dataset can then be read out by the switching device, and a corresponding configuration can be implemented in the first mode or the second mode.

Further conceivable is configuration by means of a parameter, which is provided to the switching device at the start.

Operation is preferably held constant in the first mode or the second mode during operation of the end system device after a start. Expressed differently, the end system device is started by supplying power or using a switch, for example, the switching device is configured, and the mode cannot be subsequently changed during operation, i.e., until the end system device or switching device is turned off, for example. As a result, operation and correct relaying of data can be ensured after the network with the end system devices has been broken down, since one of the end system devices is prevented from switching over to another mode, which can lead to malfunctions in the network system.

Such an end system device described above and an accompanying method can preferably be designed for communication between aircraft systems, in particular airplane systems. In particular, an end system device and an accompanying method can be designed to communicate in AFDX networks, at least in the case of configuration in the first mode.

However, such an end system device described above and an accompanying method can also be designed for use in an automobile (automobile end system) or in another vehicle (vehicle end system). This is advantageous in particular in vehicles where elevated requirements are placed on data transmission between end systems, such as sensors and control devices of a vehicle, owing to drive-by-wire, automated driving, etc. Autonomy along with driver assistance systems or Advanced Driver Assistance Systems (ADAS) are also to be mentioned here as keywords. Also provided are configurations for use in ships, industrial plants, etc.

The end system device is here preferably designed for deterministic network communication.

As known to the expert, end system devices or end systems are devices connected with a computer network that sit at the edge of the network. These end systems provide information and services. Expressed differently, end systems are devices whose applications access the network components, so as to transmit or receive data from the network, such as sensors, control devices, etc. In the case of AFDX, the end systems can be designed as AFDX end systems, which are part of an avionics or aircraft subsystem, which have to send data over the AFDX network, for example. Expressed differently, a subsystem, for example an avionics or aircraft subsystem, comprises an end system or an end system device as described above, which here is preferably designed as an AFDX end system device.

A corresponding method for an end system device here comprises the steps of switching a switching device of the end system device into a first or second mode. In the second mode, the method comprises the step of relaying data received at a first and a second port of the end system device to a local interface of the end system device, and relaying data received at the interface to the first port and the second port. In the second mode, the method further comprises the step of relaying data received at the first port to the second port or to the interface, relaying the data received at the second port to the first port or to the interface, and relaying data received at the interface to the first port and the second port.

Let it here be noted that the term "relay" is to be construed to mean that the data or at least the user data of a data packet are received at one point and output at another point. An adjustment of the data packet can here be provided, for example a change in the header or the like.

In another exemplary embodiment not shown on the figures, a second switching device can be provided, which is set up identically with the switching device described above. All above statements thus apply accordingly to a second switching device. The second switching device is here used for integration into the described second network of the network system.

In addition, let it be noted that "comprising" and "having" do not rule out other elements or steps, and that "a" or "an" do not preclude a plurality. Let it further be noted that features or steps described with reference to one of the above exemplary embodiments can also be used in combination with other features or steps of other exemplary embodiments described above. Reference numbers in the claims are not to be regarded as a limitation.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An end system device for a network system, the end system device comprising:
    a first network port for connection with the network system;
    a second network port for connection with the network system;
    a local interface to connect with local components of the end system; and
    a switching device integrated with the end system device and configured to switch into a first mode or a second mode, wherein:
    in the first mode, the switching device is set to relay data received at the first network port to the local interface, to relay data received at the second network port to the local interface, and to relay data received at the local interface to both the first network port and the second network port, without relaying data between the first network port and the second network port; and
    in the second mode, the switching device is set to relay data received at the first network port to either the second network port or to the local interface, relay data received at the second network port to either the first network port or to the local interface, and relay data received at the local interface to both the first network port and the second network port.

2. The end system device of claim 1, wherein the switching device, in the first mode, relays data from the first network port or the second network port to the local interface if no copy of the data was received at the end system device chronologically prior to receiving the data, and discards data received at the first network port or the second network port if a copy of the data was received at the end system device chronologically prior to receiving the data.

3. The end system device of claim 1, wherein the switching device, in the second mode:
    relays data received at the first network port to the local interface if the data are intended for the end system device, and if no copy of the data was received at the end system device chronologically prior to receiving the data;
    relays data received at the first network port to the second network port if the data are not intended for the end system device;
    relays data received at the second network port to the local interface if the data are intended for the end system device, and if no copy of the data was received at the end system device chronologically prior to receiving the data; and
    relays data received at the second network port to the first network port if the data are not intended for the end system device.

4. The end system device of claim 1, wherein the switching device is configured to switch between the first mode and the second mode as a function of at least one of:
    a resistance;
    an input signal; and
    a configuration parameter.

5. The end system device of claim 1, wherein the switching device is configured to switch into the first mode or the second mode when the end system device starts operating, and is further configured to keep the latter constant during operation of the end system device.

6. The end system device of claim 1, wherein the end system device is configured to communicate with an Avionics Full Duplex Switched Ethernet (AFDX) network.

7. The end system device of claim 1, wherein the end system device is configured to communicate between vehicle end systems.

8. A network system for communication between end systems, the network system comprising at least one end system device configured in accordance with claim 1.

9. A vehicle comprising at least one end system device configured in accordance with claim 1.

* * * * *